US008446603B2

(12) United States Patent
Krupp

(10) Patent No.: US 8,446,603 B2
(45) Date of Patent: May 21, 2013

(54) SYSTEMS AND METHODS FOR OPTIMIZING FUNCTION BASED OBJECT OPERATIONS IN INTERPRETED PAGE DESCRIPTION LANGUAGES

(75) Inventor: Louis Krupp, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 566 days.

(21) Appl. No.: 12/753,685

(22) Filed: Apr. 2, 2010

(65) Prior Publication Data

US 2011/0242566 A1 Oct. 6, 2011

(51) Int. Cl.
*G06F 15/00* (2006.01)
*G06F 3/12* (2006.01)
*G06K 1/00* (2006.01)

(52) U.S. Cl.
USPC .......................................... 358/1.13; 358/1.1

(58) Field of Classification Search
None
See application file for complete search history.

(56) References Cited

U.S. PATENT DOCUMENTS

| 7,191,433 B2* | 3/2007 | Narad et al. | 717/140 |
| 2006/0059462 A1* | 3/2006 | Yamamoto | 717/115 |
| 2008/0304097 A1* | 12/2008 | Maglanque et al. | 358/1.15 |

OTHER PUBLICATIONS

Smooth Shading, Technical Note #5600, LanguageLevel 3, Adobe Systems Incorporated (1997).

* cited by examiner

*Primary Examiner* — Douglas Tran
(74) *Attorney, Agent, or Firm* — Finnegan, Henderson, Farabow, Garrett & Dunner, L.L.P.

(57) ABSTRACT

Methods for optimizing the processing of function based object operations in interpreted page description languages are presented. In some embodiments, the method comprises parsing the PDL document to identify a function based operator in the PDL document; generating program code in a programming language, wherein the program code is functionally equivalent to the function based operator; compiling the program code to generate a shared object and dynamically linking the software that performs the document processing functions to the entry point of the shared object; and invoking the shared object associated with the function based operator when the function based operator is processed.

20 Claims, 4 Drawing Sheets

SYSTEMS AND METHODS FOR OPTIMIZING FUNCTION BASED OBJECT OPERATIONS IN INTERPRETED PAGE DESCRIPTION LANGUAGES

BACKGROUND

1. Technical Field

The present disclosure pertains to the field of printing and in particular, to systems and methods for the optimizing the processing of function based object operations in interpreted page description languages.

2. Description of Related Art

Document processing software allows users to view, edit, process, store, and print documents conveniently. The document may be described in a page description language ("PDL"). PDL's may include PostScript, Adobe PDF, HP PCL, Microsoft XPS, and variants thereof. A PDL description of a document provides a high-level description of each page in a document. This PDL description is often translated to a series of lower-level printer-specific commands when the document is being printed.

PDL descriptions are typically interpreted by a language processor, which converts the PDL instructions into another form suitable for printing. For example, when a document described using PostScript is interpreted, an interpreter converts PostScript instructions into printable output. PostScript and/or PostScript-compatible interpreters are widely used in printers and multi-function peripherals (MFPs).

In many situations, PostScript instructions may include mathematical functions that are associated with operators, which can operate on objects such as printable areas. For example, the mathematical functions may describe how a particular operation varies across an object or area that is the target of the operation.

Such mathematical functions are often specified as a Postscript procedure and may be called once for each sampled point in the area in order to yield the object attribute at that point. Because Postscript procedures are interpreted, calling a procedure thousands of times may cause significant processing overhead and use considerable processor or CPU time. Such processing delays may lead to lower throughput for a given processor and/or may result in design tradeoffs that result in lower quality print output. Thus, there is a need for systems and methods that permit the processing of functions associated with object operators in page description languages in a more optimal manner.

SUMMARY

Consistent with disclosed embodiments, systems and methods for optimizing the processing of function based object operations in interpreted page description languages are presented. In some embodiments, the method comprises processing at least one page in a document described using an interpreted page description language by: parsing the PDL document to identify a function based operator in the PDL document; generating program code in a programming language, wherein the program code is functionally equivalent to the function based operator; compiling the program code to generate a shared object and dynamically linking the entry point of the shared object to the PDL interpreter; and invoking the shared object associated with the function based operator when the function based operator is processed.

Embodiments disclosed also relate to methods created, stored, accessed, or modified by processors using computer-readable media or computer-readable memory. These and other embodiments are further explained below with respect to the following figures.

DETAILED DESCRIPTION

In accordance with embodiments reflecting various features of disclosed embodiments, systems and methods for optimizing the processing of function based object operations in interpreted page description languages are presented. For example, documents to be printed may be specified using PDLs, which can include mathematical functions that operate on objects such as printable areas. For example, the mathematical functions may describe how a particular operation varies across an object or area that is the target of the operation. Techniques to optimize the processing of such mathematical functions in interpreted PDL languages are disclosed. These techniques may be extended in various ways as would be apparent to one of ordinary skill in the art.

Figure 1:
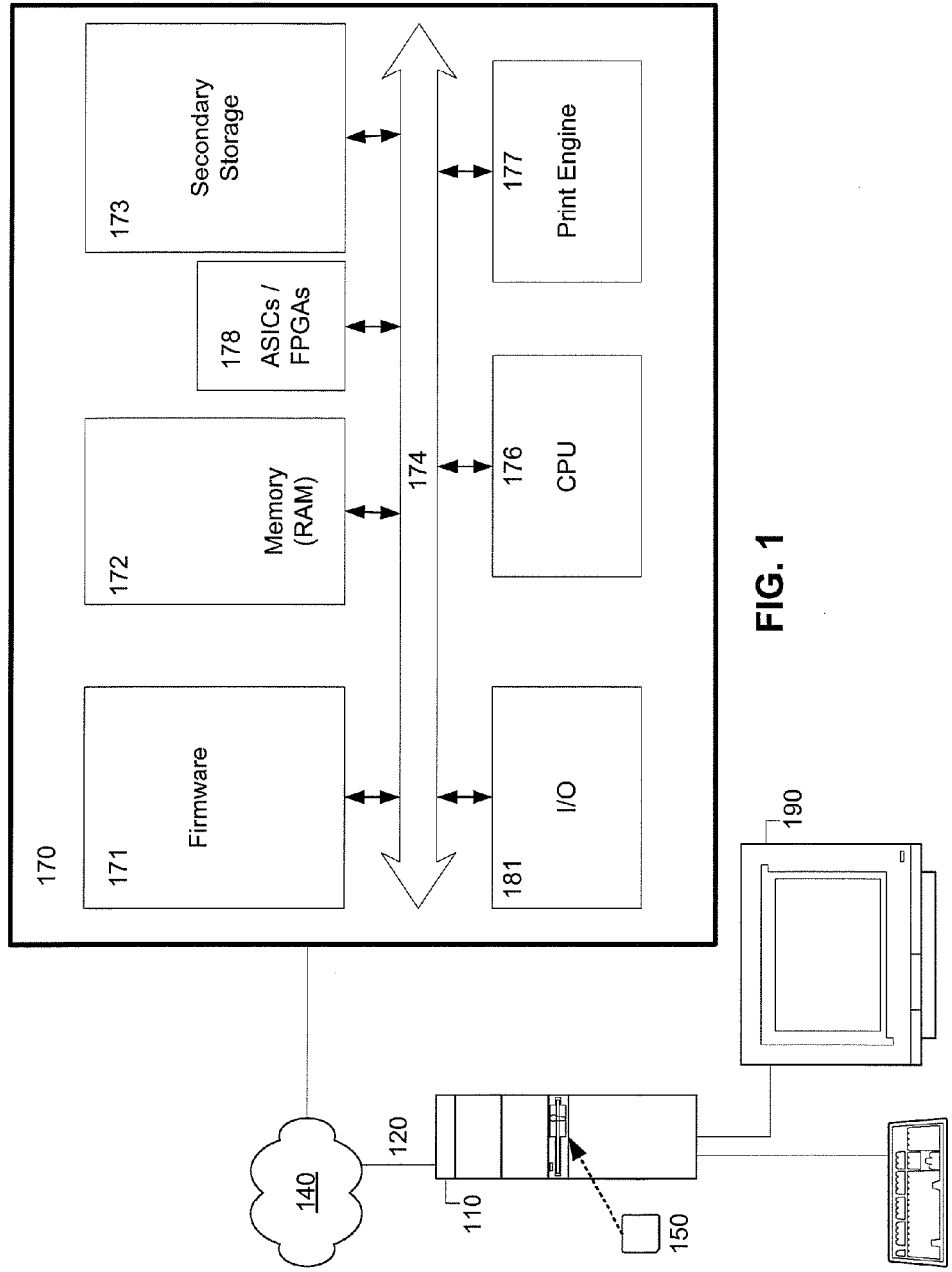
FIG. 1 shows a high-level block diagram of an exemplary system capable of executing an application for optimizing the processing of function based object operations in interpreted page description languages.

FIG. 1 shows a high-level block diagram of an exemplary system 100 capable of executing an application for optimizing the processing of function based object operations in interpreted page description languages. In general, a computer software application consistent with disclosed embodiments may be deployed on system 100, which can include networked computers 110 and printers 170 that are connected through communication links that allow information to be exchanged using conventional communication protocols and/or data port interfaces.

As shown in FIG. 1, exemplary system 100 includes computer or computing device 110 and printer 170, which are coupled using network 140. Network 140 may include subnets, Local Area Networks (LANs), and/or Wide Area Networks (WANs). Further, network 140 may also include modems, routers, repeaters, and other communication devices (not shown) that permit peripherals that are coupled to a network 140 to communicate with other devices over wired or wireless connections in accordance with the policies set by a network administrator.

In general, computing device 110 may be a computer workstation or desktop computer, laptop or portable computer, handheld device, or any other mobile computing device capable of being used in a networked environment. Computing device 110 and printer 170 may be capable of executing software (not shown) that facilitates the optimal processing of function based object operations in interpreted page description languages Computing device 110 and printer 170 may contain removable media drives 150. Removable media drives 150 may include, for example, 3.5 inch floppy drives, CD-ROM drives, DVD ROM drives, CD±RW or DVD±RW drives, USB flash drives, Memory Sticks™, Secure Digital High Capacity ("SDHC") cards, and/or any other removable media drives consistent with embodiments of the present invention. Portions of software applications may reside on removable media and be read and executed by computing device 110 using removable media drive 150. In some embodiments, intermediate and final results and/or reports generated by applications may also be stored on removable media.

Printers 170 may be laser printers, ink jet printers, LED printers, plotters, and of various other types. From a functional perspective, printers 170 may take the form of computer printers, facsimile machines, digital copiers, multifunction devices, and/or various other devices that are capable of printing documents.

Connection 120 couples computing device 110 and printer 170 to network 140. Connection 120 may be implemented as a wired or wireless connection using appropriate conventional communication protocols and/or data port interfaces. In general, connection 120 can be any communication channel that allows transmission of data between the devices. In one embodiment, for example, devices may be provided with data ports, such as USB™, SCSI, FIREWIRE™, and/or BNC ports for transmission of data through the appropriate connection 120. The communication links could be wireless links or wired links or any combination that allows communication between computing device 110 and printer 170.

Printer 170 may be controlled by hardware, firmware, or software, or some combination thereof. A computer software application to optimize the processing of function based object operations in interpreted page description languages may be deployed on one or more of exemplary computer 110 and/or printer 170, as shown in FIG. 1. For example, printer 170 may execute software or firmware that permits printer 170 to optimize the processing of function based object operations in a manner consistent with disclosed embodiments. In another example, an application to optimize the processing of function based object operations in interpreted page description languages may be resident on computer 110 and operate on PDL data intended for printer 170. In general, applications may execute in whole or in part on one or more computer 110 and/or printers 170 in the system. The embodiments described herein are exemplary only and other embodiments and implementations will be apparent to one of ordinary skill in the art.

Exemplary printer 170 may contain bus 174 that couples CPU 176, firmware 171, memory 172, input-output ("I/O") module 181, print engine 177, and secondary storage device 173. Exemplary printer 170 may also contain other Application Specific Integrated Circuits (ASICs), and/or Field Programmable Gate Arrays (FPGAs) 178 that are capable of executing portions of an application to optimize the processing of function based object operations in interpreted page description languages. In some embodiments, exemplary printer 170 may also be capable of executing software including, a printer operating system, various PDL processing and optimization routines, parsing and conversion routines, database management software, software to process print job requests, printer status requests, printer configuration software, as well as other appropriate application software.

Exemplary I/O module 181 may also permit communication with computer 110 over network 140. Information received from computer 110 and/or print controllers 175 may be processed by I/O module 181 and stored in memory 172. I/O module 181 may also notify CPU 176 about the communications. The communications may include data, commands, information pertaining to the location and formatting of language data files, capability requests, status requests, responses, and/or acknowledgements according to the protocol being used. CPU 176 may retrieve any information stored in memory 172 and process the information further.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, one or more pre-defined routines including routines to: process documents described using PDLs, compilers for programming languages, automatic code generation routines, optimization routines for the processing of function based object operations in interpreted page description languages; process incoming requests and messages; compose outgoing responses and messages; as well as routines for configuration management, routines for document processing, and other code. In some embodiments, code and data in firmware 171 may be copied to memory 172 prior to being acted upon by CPU 176. Data and instructions in firmware 171, including any PDL processing and optimization routines may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. In some embodiments, documents, which may include PDL data, may be sent from computer 110 to printer 170 for printing. ASICs/FPGAs 178 may also provide control and data to print engine 177. FPGAs/ASICs 178 may also implement one of configuration management, message processing, and other print related algorithms. Intermediate and final printable data, messages, printer status, and configuration information pertaining to one or more printers 170 may be stored in memory 172 or secondary storage 173.

In some embodiments, computing device 110 may send printable data in a document specified using a PDL to printer 170. In some instances, the document may include PDL command sequences that include function based object operators. For example, a PostScript document may include a smooth shading function that permits a smooth transition from one color to another color. In PostScript, smooth shading can be used to separate the geometry of an object (such as the area to be filled) from the description of the colors to be used to create the transition or color gradient fill.

In some situations, the PostScript "shfill" operator may be used to perform smooth shading operations on a printable area. The "shfill" operator uses an operand specified as a Shading dictionary, which contains details of the type of shading, the geometry of the area or object to be shaded, and the geometry of the color gradient fill. In addition, the Shading dictionary can contain a Function dictionary. In function-based shading: the color of every point in the domain is defined by a mathematical or sampled function. The mathematical function does not necessarily have to be smooth or continuous and permits a concise representation of complicated gradients. In other words, the mathematical function can specify the color of every point in a domain by a two-dimensional object that uses a mathematical or sampled function to map each point in the domain to a specific color value. The domain refers to the printable area to which the color gradient or transition is being applied.

Printer 170 may invoke routines to parse the PDL document, render the printable data into a final form of printable data, and print according to this final form, which may take the form of a pixmap. In some embodiments, routines to parse and process documents described using PDLs, compile programming languages, automatic code generation routines, optimization routines for the processing of function based object operations in interpreted page description languages may be stored in secondary storage 173 or removable media coupled to printer 170. In some embodiments, the routines may be resident on removable media or a hard drive on computer 110.

Figure 2:
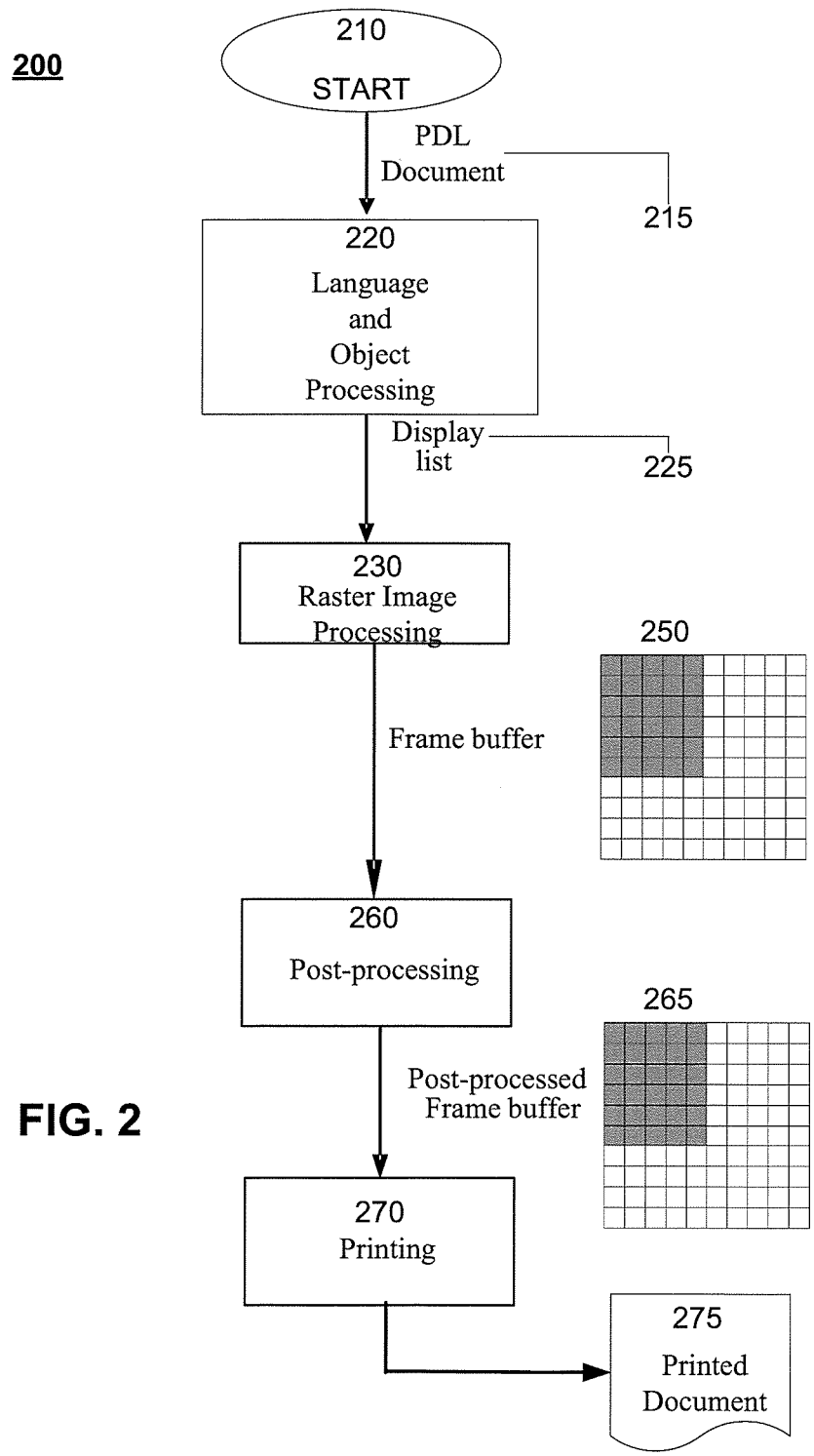
FIG. 2 shows exemplary process flow illustrating steps in a method for rendering printable data from PDL descriptions.

FIG. 2 shows exemplary process flow 200 illustrating steps in a method for rendering printable data from PDL descriptions, which may include function based object operators. In some embodiments, the process may start in step 210 with the initiation of a print job, which, in some instances, may be a document specified in an interpreted PDL, which may include function based object operators.

In step 220, the document 215 can also be subjected to language and object processing. For example, data in the PDL document may be parsed by a PDL parser. The PDL parser may identify various objects, operators, and structures in the PDL data and perform operations or initiate actions associated with the recognized objects, operators and/or structures.

In some embodiments, the parser may identify function based object operators in PDL document 215, convert the function based descriptions into program code in a programming language such as (but not limited to) the "C" programming language, compile the resulting program code, and link the compiled program code as a shared object to the PDL interpreter.

For example, in one implementation, where document 215 is described using PostScript, a function based operator (such as "shfill") may be used a key to a dictionary entry that points to the shared object file. Instead of interpreting the PostScript function-based operator when the operator is processed, the shared object file may be dynamically invoked. Accordingly, instead of the repeated interpretation of the function based operator in the PDL, the compiled shared object (corresponding to the function based operator) is dynamically linked to the PDL interpreter and executed when the function is processed.

In addition to the operations above, PDL parser may also perform various other functions such as identifying individual objects (such as text, images, and graphics. For example, printable data in the document may be categorized as text, image, and graphics data. These operations may also result in the placement of graphic primitives that describe the graphics object in display list 225. Exemplary display list 225 may be an intermediate step in the processing of data prior to actual printing and may be parsed further before conversion into a subsequent form. Display list 225 may include such information as color, opacity, boundary information, and depth for display list objects.

The conversion process from a display list representation to a form suitable for printing on physical media may be referred to as rasterizing the data or rasterization. In some embodiments, rasterization may be performed by a Raster Image Processor in step 230. For example, basic rasterization may be accomplished by taking a three dimensional scene, typically described using polygons, and rendering the three dimensional scene onto a two dimensional surface. Polygons can be represented as collections of triangles. A triangle may be represented by three vertices in the three dimensional space. A vertex defines a point, an endpoint of an edge, or a corner of a polygon where two edges meet. Thus, basic rasterization may transform a stream of vertices into corresponding two dimensional points and fill in the transformed two dimensional triangles. Upon rasterization, the rasterized data may be stored in a frame buffer, such as exemplary frame buffer 250, which may be physically located in memory 172.

When function-based operators are used during processing, the color of every point in a domain may be defined by a mathematical or sampled function. For example, the mathematical function can map each point in a two-dimensional object to a specific color value. Accordingly, the function may be evaluated at various points in the object to determine color values for the points in the domain. In some embodiments, when a function based operator is encountered during ratsterization, the RIP may dynamically invoke the shared object file corresponding to the function-based operator. Accordingly, instead of the repeated interpretation of the function based operator in the PDL, a previously linked compiled shared object corresponding to the function based operator may be executed. In step 330, Raster Image Processing (RIP) module may process objects in display list 325 in a manner consistent with disclosed embodiments and generate a rasterized equivalent in frame buffer 350.

In some embodiments, raster image processing may be performed by printer 170. For example, raster image processing may be performed by printer 170 using one or more of CPU 176, ASICs/FPGAs 178, memory 172, and/or secondary storage 173. Raster image processing may be performed by printer 170 using some combination of software, firmware, and/or specialized hardware such as ASICs/FPGAs 178. Frame buffer 250 may hold a representation of print objects in a form suitable for printing on a print medium by print engine 177.

In some embodiments, data in frame buffer 250 may be subjected to post-processing in step 260. For example, various operations such as half-toning, trapping, etc may be carried out on the data in frame buffer 250. Because of these operations, the data in frame buffer is altered resulting in post-processed frame buffer 265. Post-processed frame buffer 265 may then be subjected to any additional processing in step 270. For example, print engine 177, may process the rasterized post-processed data in frame buffer 265, and form a printable image of the page on print medium 275, such as paper.

Figure 3:
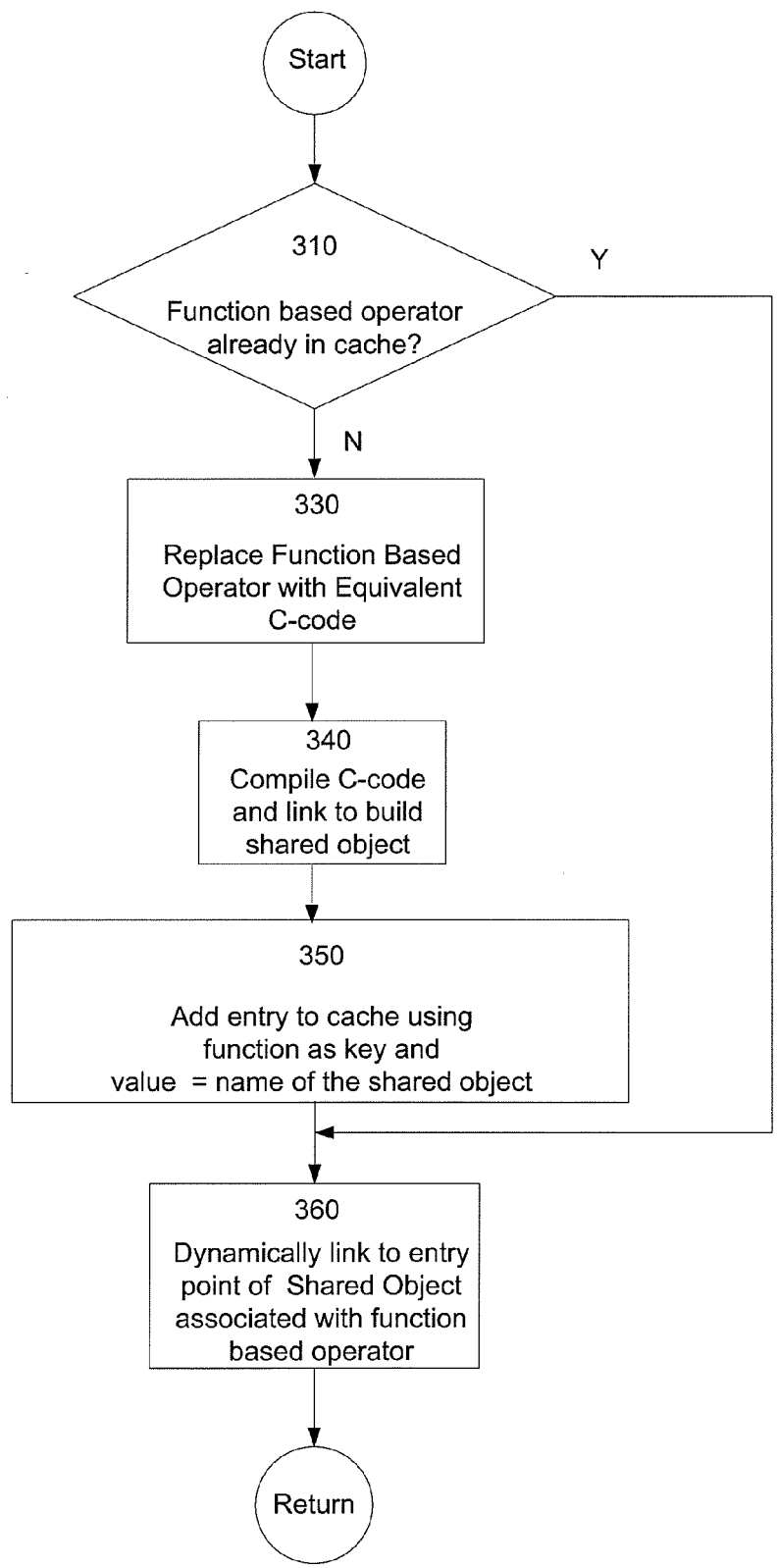
FIG. 3 shows a flowchart illustrating an exemplary method for optimizing the processing of function based object operations in interpreted page description languages.

FIG. 3 shows a flowchart illustrating an exemplary method 300 that can be used to optimize the processing of function based object operations in interpreted page description languages. In some embodiments, portions of method 300 may be performed by a parser operating on PDL document 215. In some embodiments, method 300 may be invoked by language and object processing step 220 when a function based operator is encountered during the parsing process.

In step 310, a PDL parsing routine may check whether the function based operator is already in a cache. If the function based operator is already in the cache ("Y", in step 310), then, the algorithm proceeds to step 360. If the function based operator is not in the cache ("N", in step 310), then, in step 330, the function based operator may be replaced by equivalent code in a programming language—such as the "C" programming language. In some embodiments, the equivalent program language code may be automatically generated based on the PDL description.

For example, a simple PostScript shading function may include mathematical descriptions such as $$\{1 \text{ index } 1 \text{ index add } 2 \text{ div}\}$$

The function above accepts x and y coordinates scaled to the range 0 to 1 and returns values x, y, and (x+y)/2. In some embodiments, when a mathematical function is encountered, method 300 may be invoked.

In step 330, the mathematical function can be replaced with equivalent C code. Exemplary C code equivalent to the function describe above appears below.

```
int f(const double *inp, double *outp)
{
    outp[0] = inp[0];
    outp[1] = inp[1];
    outp[2] = ((inp[0]+inp[1])/2.000000);
    return 1 ;
}
```

In some embodiments, the "C" code may be automatically generated by the parser based on the parameters associated with the function. As shown above, the "C" function "f" accepts as input a pointer to an array of two double precision floating point numbers and a pointer to an array of three double precision floating point numbers. The output includes outp[0] and outp[1], which are set equal to inp[0] and inp[1], respectively. In addition, outp[2] is set equal to one-half of the sum of inp[0] and inp[1].

In step 340, the "C" code above may be compiled and linked to build a shared object. Next, in step 350, the shared object may be associated with the function based operator. For example, in Postscript, the original function may be used as a key to a dictionary entry whose value can be the name of the shared object file. In step 360, the entry point of the shared object may be dynamically linked to the PDL interpreter or to other appropriate printer software processing the PDL document. In some embodiments, method 300 may then return control to the calling procedure. In some embodiments, the linked code may take the form of a Dynamic Linked Library ("DLL"). In some embodiments, portions of exemplary method 300 may be performed during language and object processing step 220.

Figure 4:
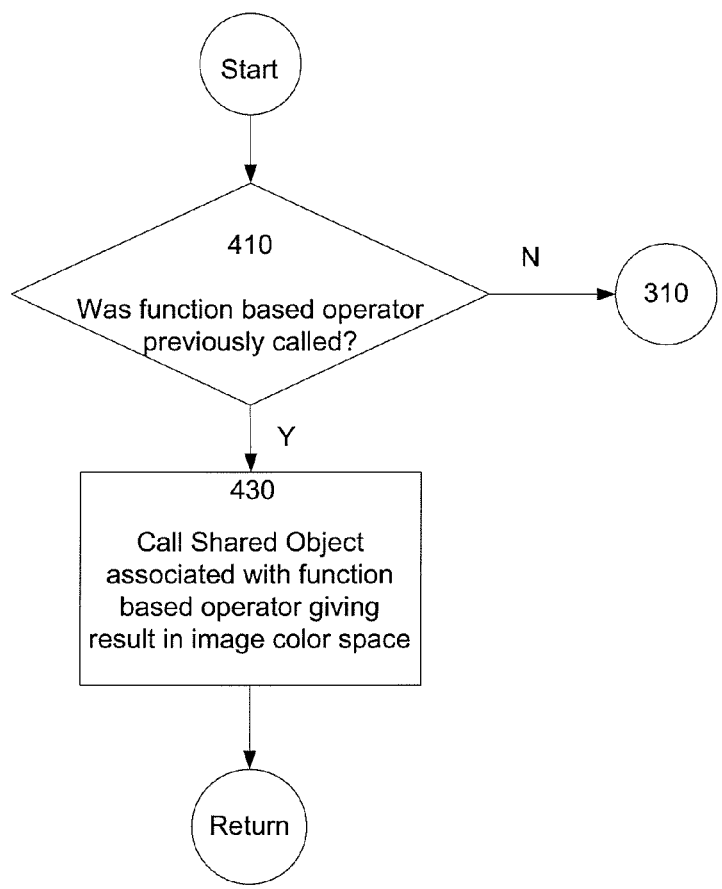
FIG. 4 shows a flowchart illustrating an exemplary method for the invocation of a shared object associated with a PDL function based operator.

FIG. 4 shows a flowchart illustrating a method 400 for the invocation of a shared object associated with a PDL function based operator. In some embodiments, method 400 may be performed during rasterization. In step 410, when a function based operator is encountered during rasterization, the algorithm may determine if the function based operator was previously called. For example, the RIP may use the function as a key to determine if a shared object is associated with the function. If the function has not been previously called ("N," in step 410), then the algorithm may invoke method 300 and proceed to step 310. If the function has been previously called ("Y", in step 410), then, in step 430, the shared object associated with the function based operator, which has been previously linked to printer software processing the PDL document, may be invoked and executed. In some embodiments, execution of the shared object may yield a result in the image color space. Method 400 may then return control to the calling routine.

Note that method 400 is shown for descriptive purposes only and that the method may be extended or modified as would be apparent to one of ordinary skill in the art. In some embodiments, portions of exemplary method 400 may be performed during Raster Image Processing step 230. In general, methods 300 and 400 may be implemented in a variety of ways depending on printing system parameters and implementation details, as well as on PDL used. For example, portions of routines implementing methods 300 and 400 may be distributed between language and object processing step 220 and raster image processing step 230.

Other implementations will be apparent to those skilled in the art from consideration of the specification and practice of disclosed embodiments. It is intended that the specification and examples be considered as exemplary only, with its true scope and spirit being indicated by the following claims.

What is claimed is:

1. A processor implemented method for processing at least one page in a document, wherein the document is described using an interpreted page description language ("PDL"), the method comprising:
    parsing the PDL document to identify a function based operator in the PDL document;
    generating program code in a programming language, wherein the program code is functionally equivalent to the function based operator;
    compiling the program code to generate a shared object and dynamically linking to the entry point of the shared object; and
    invoking the shared object associated with the function based operator when the function based operator is processed.

2. The processor implemented method of claim 1, wherein the shared object is associated with the function based operator by associating the name of the shared object with a hash table key, wherein the hash table key is the function based operator.

3. The processor implemented method of claim 1, wherein the PDL document is described in PostScript.

4. The processor implemented method of claim 3, wherein the shared object is associated with the function based operator by associating the name of the shared object with a dictionary entry associated with the function based operator.

5. The processor implemented method of claim 3, wherein the function based operator is a shaded fill function.

6. The processor implemented method of claim 1, wherein the shared object is dynamically linked to software performing the document processing.

7. The processor implemented method of claim 1, wherein the programming language used is the C programming language.

8. The processor implemented method of claim 1, wherein the program code is generated automatically.

9. The processor implemented method of claim 1, wherein the method is performed on:
    a computer;
    a printer; or
    a printer coupled to a computer.

10. The processor implemented method of claim 1, wherein the PDL document is described in the Portable Document Format ("PDF") language.

11. A non-transitory computer-readable medium that stores instructions, which when executed by a processor perform a method for processing at least one page in a document, wherein the document is described using an interpreted page description language ("PDL"), the method comprising:
    parsing the PDL document to identify a function based operator in the PDL document;
    generating program code in a programming language, wherein the program code is functionally equivalent to the function based operator;
    compiling the program code to generate a shared object and dynamically linking to the entry point of the shared object; and
    invoking the shared object associated with the function based operator when the function based operator is processed.

12. The non-transitory computer-readable medium of claim 11, wherein the shared object is associated with the function based operator by associating the name of the shared object with a hash table key, wherein the hash table key is the function based operator.

13. The non-transitory computer-readable medium of claim 11, wherein the PDL document is described in PostScript.

14. The non-transitory computer-readable medium of claim 13, wherein the shared object is associated with the function based operator by associating the name of the shared object with a dictionary entry associated with the function based operator.

15. The non-transitory computer-readable medium of claim 11, wherein the function based operator is a shaded fill function.

16. The non-transitory computer-readable medium of claim 11, wherein the shared object is dynamically linked to software performing the document processing.

17. The non-transitory computer-readable medium of claim 11, wherein the programming language used is the C programming language.

18. The non-transitory computer-readable medium of claim 11, wherein the program code is generated automatically.

19. The non-transitory computer-readable medium of claim 11, wherein the method is performed on:
   a computer;
   a printer; or
   a printer coupled to a computer.

20. A non-transitory computer-readable memory that stores instructions, which when executed by a processor perform a method for processing at least one page in a document, wherein the document is described using an interpreted page description language ("PDL"), the method comprising:
   parsing the PDL document to identify a function based operator in the PDL document;
   generating program code in a programming language, wherein the program code is functionally equivalent to the function based operator;
   compiling the program code to generate a shared object and dynamically linking to the entry point of the shared object; and
   invoking the shared object associated with the function based operator when the function based operator is processed.

* * * * *